US012791057B2

(12) United States Patent
Leblanc et al.

(10) Patent No.: US 12,791,057 B2
(45) Date of Patent: Nov. 10, 2026

(54) BEARING DEVICE AND ASSOCIATED MACHINE

(71) Applicant: Aktiebolaget SKF, Gothenburg (SE)

(72) Inventors: James P. Leblanc, Luleå (SE); Stijn Van Eesbeek, Doorn (NL)

(73) Assignee: Aktiebolaget SKF, Gothenburg (SE)

( * ) Notice: Subject to any disclaimer, the term of this patent is extended or adjusted under 35 U.S.C. 154(b) by 93 days.

(21) Appl. No.: 18/905,234

(22) Filed: Oct. 3, 2024

(65) Prior Publication Data

US 2025/0116299 A1 Apr. 10, 2025

(30) Foreign Application Priority Data

Oct. 10, 2023 (DE) ......................... 102023209853.9

(51) Int. Cl.

| | |
|---|---|
| ***F16C 19/52*** | (2006.01) |
| ***F16C 19/06*** | (2006.01) |
| ***F16C 33/58*** | (2006.01) |
| ***F16C 41/00*** | (2006.01) |
| ***G01L 5/00*** | (2006.01) |
| ***G01M 13/045*** | (2019.01) |

(52) U.S. Cl.

CPC .............. *F16C 19/52* (2013.01); *F16C 19/06* (2013.01); *F16C 33/586* (2013.01); *F16C 41/008* (2013.01); *G01L 5/0019* (2013.01); *G01M 13/045* (2013.01); *F16C 2233/00* (2013.01)

(58) Field of Classification Search

CPC ........ F16C 19/06; F16C 19/52; F16C 19/522; F16C 19/525; F16C 19/527; F16C 33/586; F16C 41/008; F16C 2233/00; G01L 5/0019; G01M 13/045

See application file for complete search history.

(56) References Cited

U.S. PATENT DOCUMENTS

| | | | | |
|---|---|---|---|---|
| 4,203,319 | A * | 5/1980 | Lechler | G01L 5/0019 73/862.541 |
| 4,341,122 | A * | 7/1982 | Lechler | G01L 5/1627 73/862.045 |
| 2006/0257060 | A1* | 11/2006 | Gempper | G01L 5/0019 384/448 |
| 2010/0074567 | A1* | 3/2010 | Giordana | F16C 33/586 384/448 |
| 2020/0063794 | A1* | 2/2020 | Lang | F16C 33/583 |
| 2023/0016206 | A1* | 1/2023 | Hubert | F16C 19/522 |
| 2024/0183394 | A1* | 6/2024 | Koike | F16C 33/585 |

FOREIGN PATENT DOCUMENTS

| | | | | |
|---|---|---|---|---|
| CN | 110645266 | A * | 1/2020 | F16C 23/02 |
| CN | 113153898 | A * | 7/2021 | F16C 33/583 |
| JP | 2002213441 | A * | 7/2002 | F16C 33/586 |

* cited by examiner

*Primary Examiner* — Phillip A Johnson

(74) *Attorney, Agent, or Firm* — Stinson LLP

(57) ABSTRACT

A bearing device includes a bearing (4) having a first ring (5) and a second ring (6) which rotate concentrically relative to one another. An annular sensing ring (9) is mounted on the second ring (6) of the bearing. The annular sensing ring (9) includes sensors (10) arranged on the inner or outer surface of the second ring and measure physical parameters of the bearing and wired connections (11) connecting the sensors (10). The sensors (10) are connected together by at least one wired connection (11) so that each sensor (11) is connected to at least two wired connections to form the annular sensing ring (9).

18 Claims, 3 Drawing Sheets

BEARING DEVICE AND ASSOCIATED MACHINE

CROSS-REFERENCE TO RELATED APPLICATION

This application claims priority to German Application No. 102023209853.9, filed Oct. 10, 2023, the entirety of which is hereby incorporated by reference.

FIELD

The present disclosure is directed to the monitoring of a bearing.

More particularly, the present disclosure deals with the arrangement of sensors on a bearing.

BACKGROUND

Generally, the monitoring of a bearing is based on measurements delivered by sensors placed at some distance from the bearing.

The distance between the sensors and the bearing implies more disturbances in the acquired measurements, limiting the quality of the measurements.

Furthermore, such placement of the sensors limits the type of measurements obtained.

Vibrations may be measured by a vibration sensor placed at some distance from the bearing.

However, measuring loads applied on the bearing or measuring the temperature of the bearing requires that the load sensor or the temperature sensor is arranged on the bearing.

For example, radial load applied on the bearing is unobtainable when sensors are placed far from the bearing.

It is known to implement Fiber Optic System FOS to measure strain and temperature of the bearing.

However, implementing strain measurements using FOS or other methods on the bearing brings different mounting constraints, for example the arrangement of cabling and/or pigtails on the bearing, and the relative high cost of FOS.

Consequently, the present disclosure intends to simplify the monitoring of a bearing, for example for the monitoring of loads applied on the bearing and temperature of the bearing.

SUMMARY

According to an aspect, a bearing device is proposed.

The bearing device comprises:

- a bearing provided with a first ring and with a second ring capable of rotating concentrically relative to one another,
- an annular sensing ring mounted on the second ring of the bearing,
- the annular sensing ring comprising sensors arranged on the inner or outer surface of the second ring and configured to measure physical parameters of the bearing, and wired connections connecting the sensors.

The sensors are connected together by at least one wired connection so that each sensor is connected to at least two wired connections to form the annular sensing ring.

The sensors are directly on the bearing thus allowing a higher quality of measurement of radial and axial loads, temperature and vibration, and providing a higher level of insight into the mechanical environment of the bearing.

The sensing ring allows same mounting procedures as a regular bearing as there are no radial orientation mounting constraints or cabling/pigtail access issues so that mounting the sensing ring to monitor the bearing is easier and cheaper than implementing FOS known from the prior art.

Advantageously, two successive sensors are connected together by the at least one wired connection.

Preferably, the annular sensing ring has two sensors, the two sensors being connected together by two wired connections.

Advantageously, the ring on which the second ring comprises an annular groove inside which is inserted at least partly the sensing ring.

Preferably, the wired connections are connected together to form an annular antenna of the sensing ring, the sensors being connected to the antenna so that the sensors are wireless sensors configured to transmit wirelessly measurements captured by the said sensor to processing means and receive wirelessly configuration and control commands from the processing means.

Advantageously, the sensing ring further comprises power supply means and the wired connections are connected together to form a bus, the power supply means being connected to the bus, the bus being configured to transmit measurements captured by the sensors to processing means and being configured to supply the sensors with power from the power supply means.

Preferably, the power supply means comprises a power distribution ring.

Advantageously, the bus is encapsulated in a protective membrane comprising openings to connect the bus to the power supply means.

Preferably, each sensor is chosen from a temperature sensor, a vibration sensor, a radial load sensor, an axial load sensor and a strain sensor.

According to an aspect, a machine comprising a bearing device as defined above is proposed.

BRIEF DESCRIPTION OF THE DRAWINGS

Other advantages and features of the present disclosure will appear on examination of the detailed description of embodiments, in no way restrictive, and the appended drawings in which.

DETAILED DESCRIPTION

Figure 1:
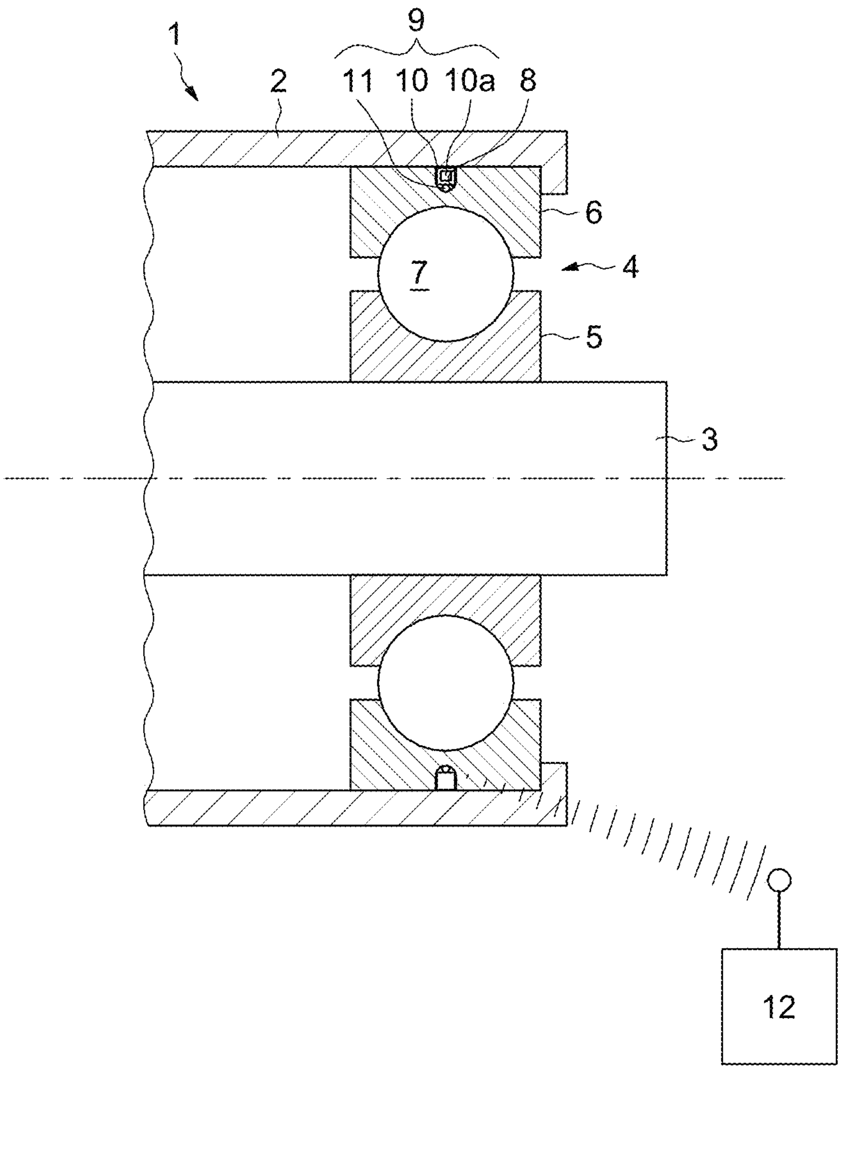
FIG. 1 illustrates schematically a rotating machine according to the present disclosure.

Reference is made to FIG. 1 which represents schematically a partial longitudinal cross section of a rotating machine 1.

The rotating machine 1 comprises a housing 2 and a shaft 3 supported in the housing 2 by a roller bearing 4.

The roller bearing 4 is provided with a first ring 5 mounted on the shaft 3, and with a second ring 6 mounted into the bore of the housing 2. The second ring 6 radially surrounds the first ring 5. The first and second rings 5, 6 rotate concentrically relative to one another.

As represented, the second ring 6 is an outer ring of the roller bearing 4 and the first ring 5 is an inner ring of the roller bearing 4.

The roller bearing 4 is further provided with a row of rolling elements 7 radially interposed between inner and outer raceways of the first and second rings 5, 6. In the illustrated example, the rolling elements 7 are balls. Alternatively, the roller bearing may comprise other types of rolling elements 7, for example rollers. In the illustrated example, the roller bearing comprise one row of rolling elements 7. Alternatively, the roller bearing comprise may comprise several rows of rolling elements.

An annular groove 8 is formed on the outer surface of the second ring 6. The groove 8 is radially oriented outwards. The annular groove 8 radially faces the bore of the housing 2.

A first embodiment of an annular sensing ring 9 is housed into the annular groove 8 of the second ring 6.

In the illustrated example, the annular sensing ring 9 is mounted on the outer surface of the second ring 6. Alternatively, the second ring 6 may be the inner ring of the the roller bearing 4 and the first ring 5 may be the outer ring of the the roller bearing 4. In this case, the annular sensing ring 9 may be housed into an annular groove formed on the inner surface of the second ring 6.

The bearing 4 and the annular sensing ring 9 form a bearing device.

The annular sensing ring 9 comprises a plurality of sensors 10 arranged around the annular groove 8 and wired connections 11 connecting the sensor.

The sensors 10 of the annular sensing ring 9 are connected together by at least one wired connection 11 so that each sensor is connected to two wired connections 11.

Two successive sensors 10 may be connected together by the wired connection 11.

The sensors 10 connected together with the wired connections 11 form the annular sensing ring 9.

When the annular sensing ring 9 has only two sensors 10, the two sensors 10 are connected together with two wired connections 11 to form the annular sensing ring 9.

The sensors 10 and the wired connections 11 are housed inside the annular groove 8.

The wired connections 11 are connected together to form an annular antenna 11*a* housed in the annular groove 8.

The sensors 10 are intended to measure physical parameters of the bearing 4.

The physical parameters may be loads applied on the bearing 4, temperature of the bearing 4, strains applied on the bearing 4, vibrations of the bearing 4.

Each sensor 10 may be chosen from a temperature sensor, a vibration sensor, a radial load, an axial load sensor and a strain sensor.

Each sensor 10 is connected to the annular antenna 11*a* and comprises wireless transmitting means and a battery 10*a* to supply the said sensor 10 with power.

The wireless transmitting means are intended to transmit wirelessly measurements captured by the said sensor to processing means 12 for further processing, and to receive wirelessly configuration and control commands from the processing means 12.

In a variant, each sensor 10 does not comprise the battery 10*a*, the sensors 10 being connected to a conduit connected to an external power source (not represented).

Figure 2:
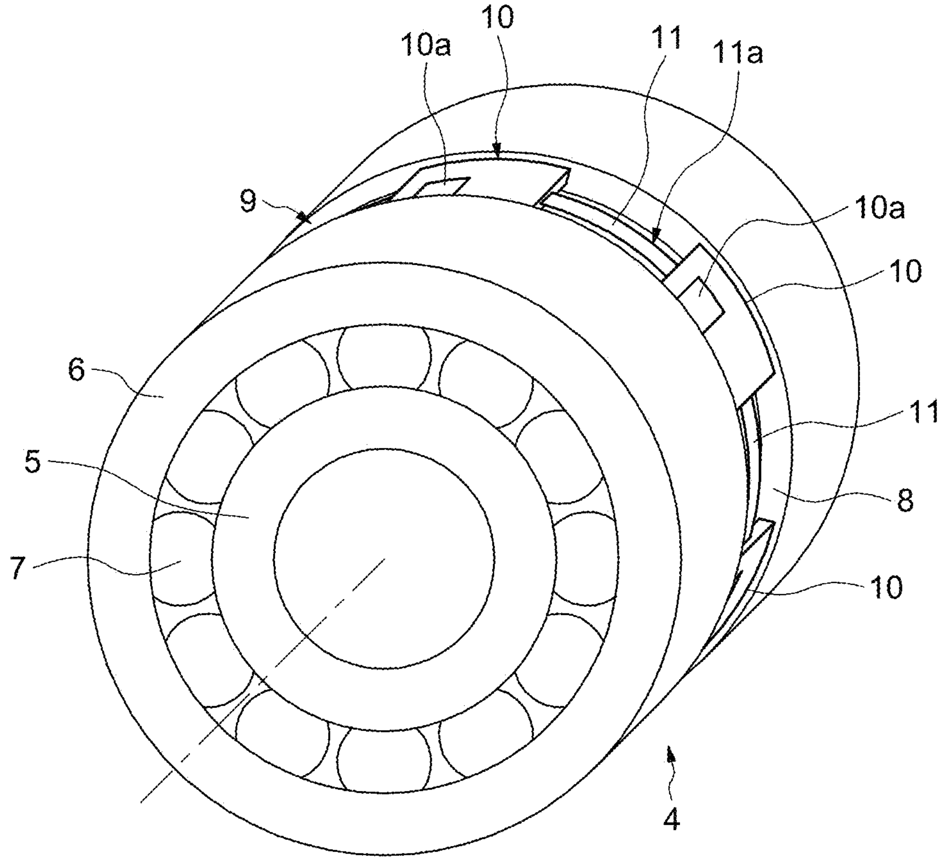
FIG. 2 illustrates schematically a first embodiment of a sensing ring according to the present disclosure.

FIG. 2 illustrates schematically the annular sensing ring 9 mounted on the outer ring 6 without the housing 2 and the shaft 3 of the machine 2.

In order to reduce the power consumption of the sensors 10 supplied by the power supply or power supply means, the first embodiment of the annular sensing ring 9 is particularly suitable for sensors 10 requiring low power consumption and processing means 12 requiring a low frequency of measurements transmission to monitor the machine 2.

Figure 3:
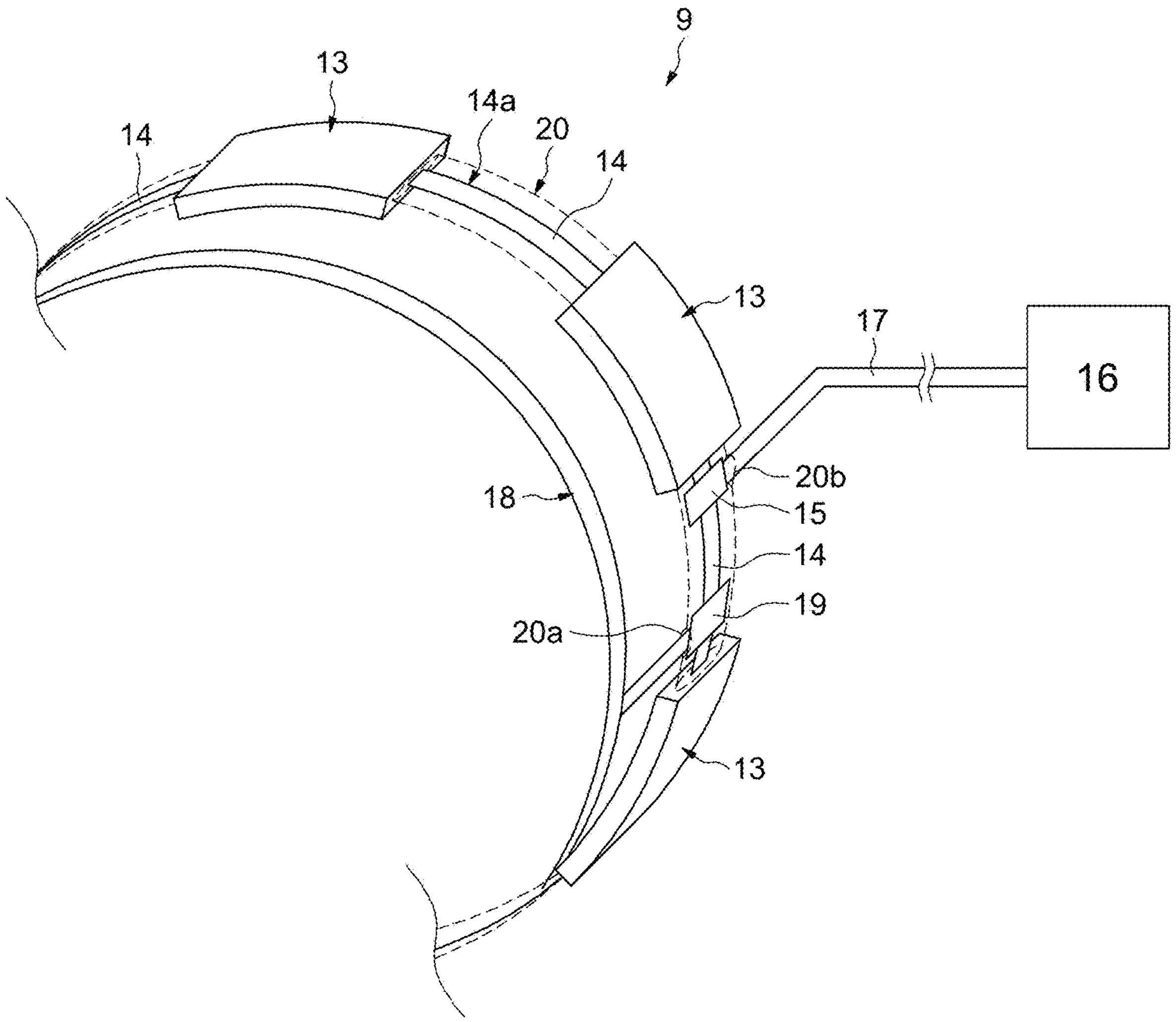
FIG. 3 illustrates schematically a second embodiment of the sensing ring according to the present disclosure.

FIG. 3 illustrates schematically a partial view of a second embodiment of the annular sensing ring 9.

The second embodiment is suitable for sensors requiring more power and/or for processing means requiring a higher frequency of measurements transmission to monitor the machine 2.

The annular sensing ring 9 comprises sensors 13 and wired connections 14 connecting the sensors 13 which are both housed in the groove 8.

The sensors 13 of the annular sensing ring 9 are connected together by at least one wired connection 14 so that each sensor is connected to two wired connections 14.

Two successive sensors 13 may be connected together by the wired connection 14.

The sensors 13 connected together with the wired connections 14 form the annular sensing ring 9.

When the annular sensing ring 9 has only two sensors 13, the two sensors 13 are connected together with two wired connections 14 to form the annular sensing ring 9.

The sensors 13 and the wired connections 14 are housed in the annular groove 8. The wired connection 14 form a bus 14*a* connecting the sensors 13.

The bus 14*a* comprises transmitting means 15 connected to processing means 16 through a wire connection 17 as represented.

The bus 14*a* is intended to deliver measurements captured by the sensors 13 to the processing means 16 for further processing.

The transmitting means 15 are intended to transmit the measurements captured by the sensors 13 to the processing means 16.

In another embodiment, the transmitting means 15 may comprise wireless transmitting means intended to transmit wirelessly measurements captured by the sensors 13 to the processing means 16.

The sensors 13 are intended to measure physical parameters of the bearing 4, for example loads applied on the bearing 4, temperature of the bearing 4, strains applied on the bearing 4, vibrations of the bearing 4.

Each sensor 13 may be chosen from a temperature sensor, a vibration sensor, a radial load sensor, an axial load sensor and a strain sensor.

The annular sensing ring 9 further comprises power supply means connected to the bus 14*a*, the bus 14*a* being intended to supply the sensors 13 with power delivered by the power supply means.

The power supply means may comprise a power distribution ring 18 connected to a supply interface 19 of the bus 14*a*.

The power supply means may be connected to a grid with a wired connection (not represented).

The annular sensing ring 9 may further comprise a protective membrane 20 encapsulating the bus 14*a*.

The protective membrane 20 protects the bus 14*a* against damage which may be caused by friction of the bus on the outer ring 6 caused by vibrations of the bearing 4.

The protective membrane 20 further isolates electrically and chemically the sensors 13, the wired connection 14, and other electronic components of the annular sensing ring 9 from other components in the external environment of the bearing device.

The protective membrane 20 comprises openings 20*a*, 20*b* to connect the power supply means to the supply interface 19 of the bus 14 and the transmitting means 15 to the wire connection 17.

As the second embodiment of the annular sensing ring 9 is at least one wired connection suppling the bus 14*a* and the sensors 13, the second embodiment of the annular sensing ring 9 is housed in an annular groove of the stationary ring of the first ring 5 and the second ring 6, the other ring being the mobile ring.

The sensors 10, 13 are directly mounted on the bearing 4 allowing a higher quality of measurement of radial and axial loads, temperature and vibration, providing a higher level of insight into the mechanical environment of the bearing 4.

The annular sensing ring 9 allows same mounting procedures as a regular bearing as there are no radial orientation mounting constraints or cabling/pigtail access issues so that mounting the annular sensing ring 9 to monitor the bearing 4 is easier and cheaper than implementing FOS known from the prior art.

What is claimed is:

1. A bearing device comprising:

a bearing including a first ring and a second ring, the first and second rings configured to rotate concentrically relative to one another; and an annular sensing ring mounted on the second ring of the bearing, the annular sensing ring comprising a plurality of sensors arranged on the inner or outer surface of the second ring, the plurality of sensors configured to measure physical parameters of the bearing, the annular sensing ring comprising wired connections connecting the plurality of sensors, the plurality of sensors being connected together by at least one wired connection so that each sensor of the plurality of sensors is connected to at least two wired connections.

2. The bearing device according to claim 1, wherein the plurality of sensors includes two sensors, the two sensors being connected together by two wired connections.

3. The bearing device according to claim 2, wherein the second ring comprises an annular groove inside which the annular sensing ring is at least partly inserted.

4. The bearing device according to claim 3, wherein the wired connections are connected together to form an annular antenna of the annular sensing ring, the plurality of sensors being connected to the antenna so that the plurality of sensors are wireless sensors configured to transmit wirelessly measurements captured by the plurality of sensors and receive wirelessly configuration and control commands.

5. The bearing device according to claim 4, wherein the annular sensing ring further comprises a power supply and the wired connections are connected together to form a bus, the power supply being connected to the bus, the bus being configured to transmit measurements captured by the sensors and being configured to supply the sensors with power from the power supply.

6. The bearing device according to claim 5, wherein the power supply comprises a power distribution ring.

7. The bearing device according to claim 6, wherein the bus is encapsulated in a protective membrane comprising openings to connect the bus to the power supply.

8. The bearing device according to claim 7, wherein each sensor of the plurality of sensors is a temperature sensor, a vibration sensor, a radial load sensor, an axial load sensor, or a strain sensor.

9. A machine comprising the bearing device according to claim 8.

10. The bearing device according to claim 1, wherein the second ring comprises an annular groove inside which the annular sensing ring is at least partly inserted.

11. The bearing device according to claim 1, wherein the wired connections are connected together to form an annular antenna of the annular sensing ring, the plurality of sensors being connected to the antenna so that the plurality of sensors are wireless sensors configured to transmit wirelessly measurements captured by the plurality of sensors and receive wirelessly configuration and control commands.

12. The bearing device according to claim 1, wherein the annular sensing ring further comprises a power supply and the wired connections are connected together to form a bus, the power supply being connected to the bus, the bus being configured to transmit measurements captured by the sensors and being configured to supply the sensors with power from the power supply.

13. The bearing device according to claim 12, wherein the power supply comprises a power distribution ring.

14. The bearing device according to claim 12, wherein the bus is encapsulated in a protective membrane comprising openings to connect the bus to the power supply.

15. The bearing device according to claim 1, wherein each sensor of the plurality of sensors is a temperature sensor, a vibration sensor, a radial load sensor, an axial load sensor, or a strain sensor.

16. A machine comprising the bearing device according to claim 1.

17. The bearing device according to claim 1, wherein each wired connection extends between and interconnect adjacent sensors of the plurality of sensors to form the annular sensing ring.

18. The bearing device according to claim 1, wherein each wired connection extends from one sensor of the plurality of sensors to an adjacent sensor of the plurality of sensors.

* * * * *